United States Patent
Hosein

(10) Patent No.: US 6,570,847 B1
(45) Date of Patent: May 27, 2003

(54) METHOD AND SYSTEM FOR NETWORK TRAFFIC RATE CONTROL BASED ON FRACTIONAL TOKENS

(75) Inventor: Patrick A. Hosein, Monmouth, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/271,910

(22) Filed: Mar. 18, 1999

Related U.S. Application Data
(60) Provisional application No. 60/114,582, filed on Dec. 31, 1998.

(51) Int. Cl.[7] .............................................. H04L 12/26
(52) U.S. Cl. .................... 370/230.1; 370/235; 370/252; 370/352; 370/389; 370/449; 709/230; 709/238
(58) Field of Search .......................... 370/230, 230.1, 370/231, 235, 236, 252, 352, 389, 400, 449, 450, 452, 454; 709/230, 232, 234, 235, 238

(56) References Cited

U.S. PATENT DOCUMENTS

| | | | | |
|---|---|---|---|---|
| 5,274,644 A | * | 12/1993 | Berger et al. ................ | 370/230 |
| 5,555,378 A | | 9/1996 | Gelman ....................... | 395/200 |
| 5,596,576 A | * | 1/1997 | Milito ......................... | 370/450 |
| 5,634,122 A | | 5/1997 | Loucks ........................ | 395/608 |
| 6,201,790 B1 | * | 3/2001 | Teboul ......................... | 370/232 |
| 6,236,650 B1 | * | 5/2001 | Dantec et al. .............. | 370/346 |
| 6,400,726 B1 | * | 6/2002 | Piret et al. ................... | 370/449 |

* cited by examiner

Primary Examiner—Alpus H. Hsu
Assistant Examiner—Roberta Stevens

(57) ABSTRACT

The present invention provides a method and system for regulating network traffic levels. The present invention utilizes a token distribution method for allocating traffic rates to network traffic sources that allows the message rate and token balance to be expressed as fractional numbers resulting in improved flexibility and smoother performance.

22 Claims, 3 Drawing Sheets

METHOD AND SYSTEM FOR NETWORK TRAFFIC RATE CONTROL BASED ON FRACTIONAL TOKENS

This application claims the benefit of U.S. Provisional Application No. 60/114,582 filed Dec. 31, 1998.

FIELD OF THE INVENTION

The present invention is directed to a method and system for regulating the rate of traffic in a telecommunications network using fractional tokens to allocate traffic rates.

BACKGROUND OF THE INVENTION

The increased use of telecommunications networks for the transmission of voice and data has resulted in drastically greater amounts of network traffic and increased demand for methods to regulate this increased traffic level. Regulation and control of this network traffic is vital to the stability and efficiency of the network infrastructure. Failure to regulate this traffic can result in some components of the network being overwhelmed by requests for service while other components are experiencing very low levels of use. In addition, some components may fail completely due to overloading, or network traffic delays through a few components could gridlock the entire network.

A network infrastructure that may be subject to these types of traffic considerations is illustrated in FIG. 1. In this system, a network traffic destination component 101 receives network traffic through network 102 from a variety of network traffic source components 103, 104, and 105. Specifically, destination component 101 is a segmentation directory, and traffic source components 103, 104, and 105 are AT&T 4ESS™ switches. When one of the 4ESS™ switches receives a telephone call connection, it sends a query message to segmentation directory (SD) 101 requesting information on how to route the call to its intended destination. Segmentation directory 101 is able to service a certain number of requests per second. When the number of requests exceeds this number, segmentation directory 101 becomes overloaded and a method to regulate the amount of traffic being received must be instituted.

One method that has been used to regulate network traffic is through the use of tokens to allocate message rates to the sources of the network traffic. In this method each traffic source maintains a bank of tokens so that whenever the traffic source has a network message to send, it must first check to see that a token is available for the message. If a token is available, the message is sent and a token is removed from the bank. If there are no tokens in the bank the traffic source must either hold the message in a queue until a token is available or discard the message unsent. Tokens are periodically added to the bank based on the desired message rate.

The desired traffic level is selected as the number of messages per second that can be handled or received by the network traffic destination, in this example the number of requests per second that segmentation directory 101 can service without overloading. That desired traffic level is then apportioned among the sources of network traffic as a number of network messages that can be sent by each traffic source per a specified control interval, for example one second. Each traffic source then typically divides the number value assigned by a predetermined number of subintervals that the control interval has been divided into, in this example 10 subintervals of 0.1 second. The resulting number is the number of tokens that are added to the bank at the beginning of each subinterval. However, present methods increment and decrement the token bank by whole numbers only and divide the tokens equally between subintervals. Any fractional amount of the originally assigned traffic level is discarded and any left over whole tokens are added in arbitrarily in one of the subintervals, typically the first subinterval. This results in a number of inefficiencies. In this example if the traffic level assigned to the traffic source is 6.5, the 0.5 fraction is rounded off. Then since 6 is not evenly divisible by 10, all 6 tokens are added in the first subinterval, resulting in a token sequence over the subintervals of 6, 0, 0, 0, 0, 0, 0, 0, 0, 0. This results in a traffic pattern that contains bursts of activity followed by periods of relative inactivity, as well as sacrificing 1 network message every 2 seconds, resulting in a traffic level lower than the desired maximum traffic level for the destination. A similarly lop-sided token sequence results from an assigned traffic level of 15, i.e. 6, 1, 1, 1, 1, 1, 1, 1, 1, 1.

SUMMARY OF THE INVENTION

The present invention is directed toward a method of allocating bandwidth for network traffic by using fractional token values.

The present method adds tokens to the token bank in fractional increments and when a traffic source checks for an available token to obtain permission to send a message, permission is granted if the balance of the token bank is greater than or equal to one. This fractional token method allows the tokens to be distributed equally among the subintervals over the entire time period regardless of whether the desired maximum traffic level is evenly divisible by the number of subintervals. The use of fractional tokens eliminates the problem of bursts of activity followed by periods of relative inactivity.

DETAILED DESCRIPTION

Figure 1:
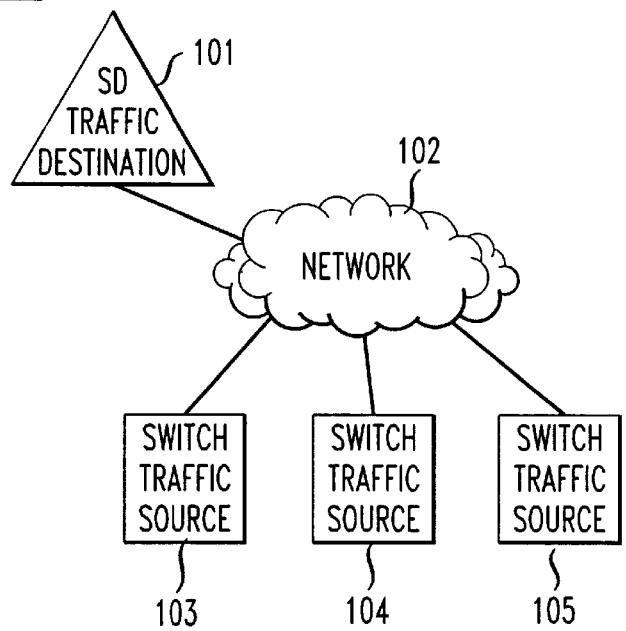
FIG. 1 illustrates a known configuration for implementing a method of allocating whole tokens at the network traffic source for regulating network traffic levels.
Figure 2:
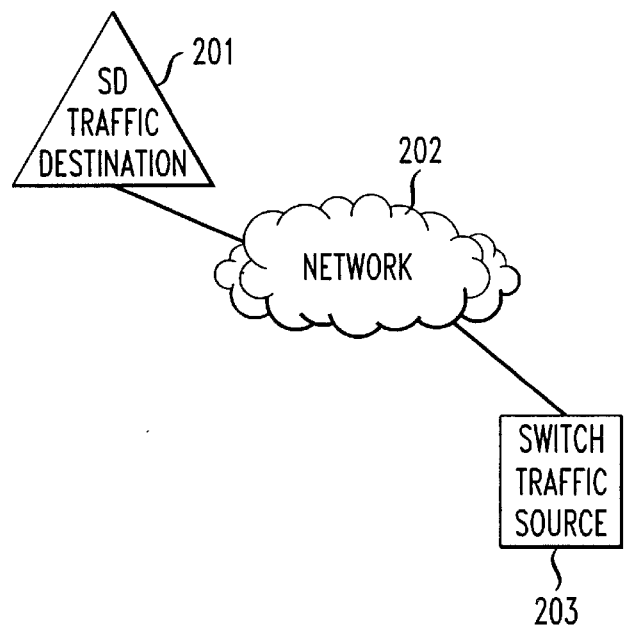
FIG. 2 illustrates an embodiment of the present invention wherein the network traffic level is regulated using fractional tokens.

An embodiment of the present invention is shown in FIG. 2 wherein a system for regulating network traffic levels is constructed utilizing a fractional token method implemented in network traffic source 203 to regulate the number of messages being sent to network traffic destination 201. In this embodiment, network traffic source 203 is a telephone switch and network traffic destination 201 is a telephone network segmentation directory. In order to properly connect an incoming telephone call, a switch receiving a call must query a segmentation directory for routing information for the incoming call. When the number of incoming calls is large, the resulting query message rate can overload segmentation directory 201. Network traffic regulation is required to prevent these kinds of problems.

The present invention accomplishes this traffic regulation through the use of fractional tokens to regulate the rate at which query messages are sent. For example, switch 203 receives a message from segmentation directory 201 indicating the desired rate at which directory 201 would like to receive messages, for example, 6.5 messages per second. Switch 203 then prepares a token bank to use to track and control the rate that query messages are being sent to segmentation directory 201. Switch 203 adds a token or fraction thereof to the bank to correspond to each message that the segmentation directory can handle in a particular time period. Typically, in order to balance the number of messages being sent at any one instant, the time periods are relatively small. For example, in this case, 0.65 tokens could be added to the token bank each tenth of a second, equaling the overall rate of 6.5 tokens per second. In contrast to the prior art, the present invention results in an effective token sequence of 0, 1, 0, 1, 1, 0, 1, 1, 0, 1 with 0.5 tokens still in the bank at the end of the second. This results in a better distribution of the queries, eliminating the problem of bursts of queries and prevents the 0.5 tokens from being dropped and thus lost. In order to prevent the tokens from accumulating in large numbers when the network traffic level is low, the token bank is periodically checked to ensure that the number of tokens does not exceed a certain threshold and if that threshold has been exceeded the number of tokens is reset to that threshold number. Typically, this action is performed at the end of the time period in which the rate is expressed, in this example at the end of each second, but it can be set to occur at any arbitrary time period desired.

The process that occurs when a query message is sent is as follows. When switch 203 needs to send a query message to directory 201, it first checks the token bank and if the number of tokens in the bank is greater than or equal to one, it sends the query message to directory 201 and decrements the token bank by one. If the number of tokens in the bank is less than one, switch 203 does not send the query message. Switch 203 can then either put the query message in a waiting queue and after a specified period of time check the token bank again or the message can simply be discarded. This process repeats for each message that switch 203 desires to send.

Figure 3:
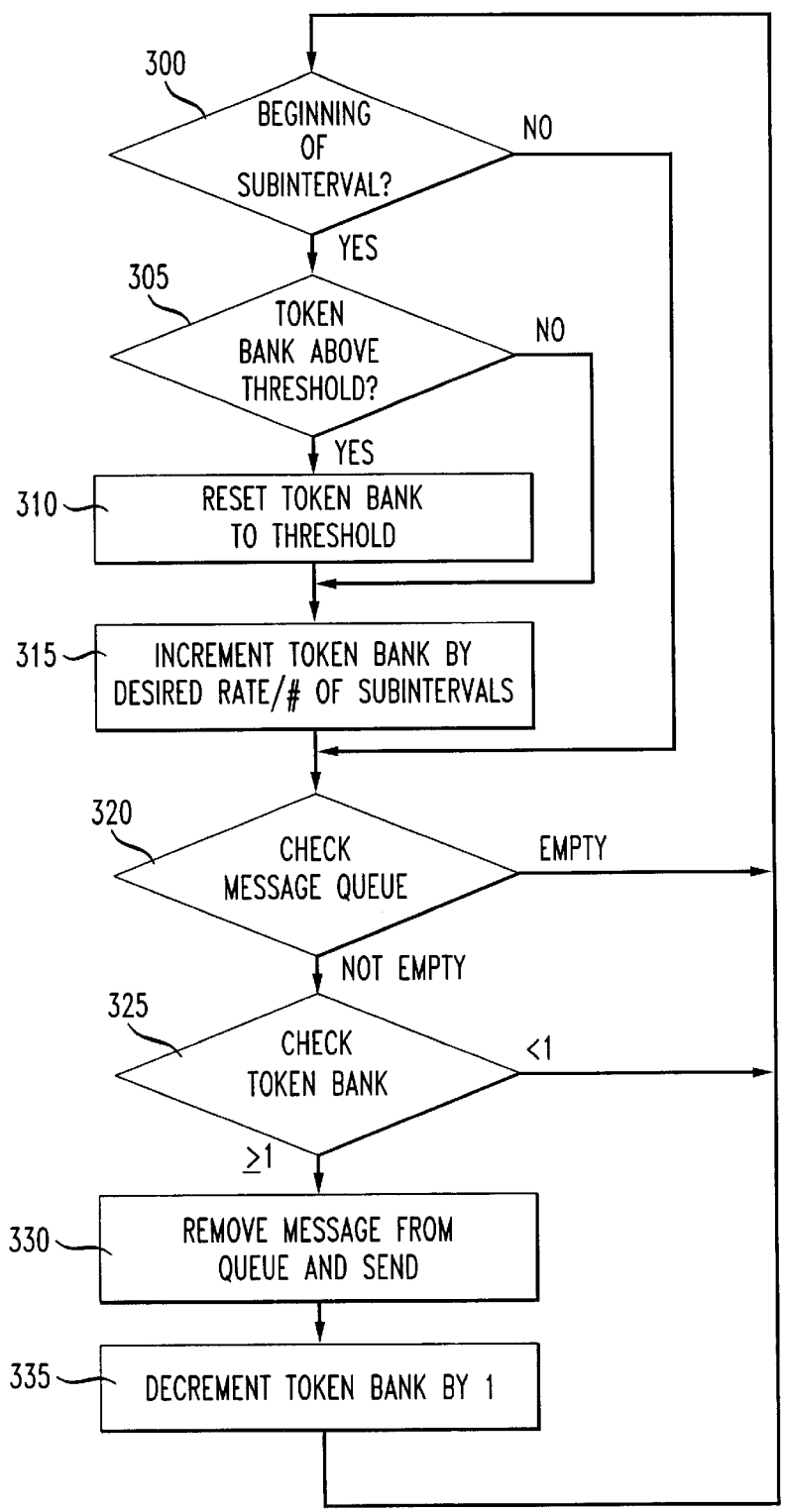
FIG. 3 illustrates a method in accordance with an embodiment of the present invention for regulating network traffic levels through the use of fractional tokens.

FIG. 3 shows in more detail the process by which a single network traffic source maintains a token bank to regulate its traffic level. FIG. 3 specifically shows the process by which a telephone switch queries a segmentation directory, and assumes that the query messages have been placed in a queue that is then handled by the traffic regulating process within the switch.

First, the switch checks to see if it is at the beginning of a time period subinterval (Step 300). If so, then the number of tokens in the bank is checked to see if it exceeds a particular threshold (Step 305) and if it does then it is reset to the threshold level (Step 310). The token bank is then incremented by a number equal to the desired rate per a particular time period divided by the number of subintervals of that period (Step 315). The switch then checks the queue to see if any query messages are waiting to be sent (Step 320). If so, then the switch checks to see if the number of tokens in the token bank is greater than or equal to one (Step 325). If the queue has at least one message in it and the token bank has one or more tokens in it, then the switch removes the first message from the queue and sends it to the segmentation directory (Step 330). The switch then decrements the token bank by one (Step 335). If the queue is empty or the number of tokens is less than one then the process skips the message sending and token decrementing steps. The entire process is then repeated. note that the queue is not a requirement of the invention, but merely one possible way of implementing it.

Figure 4:
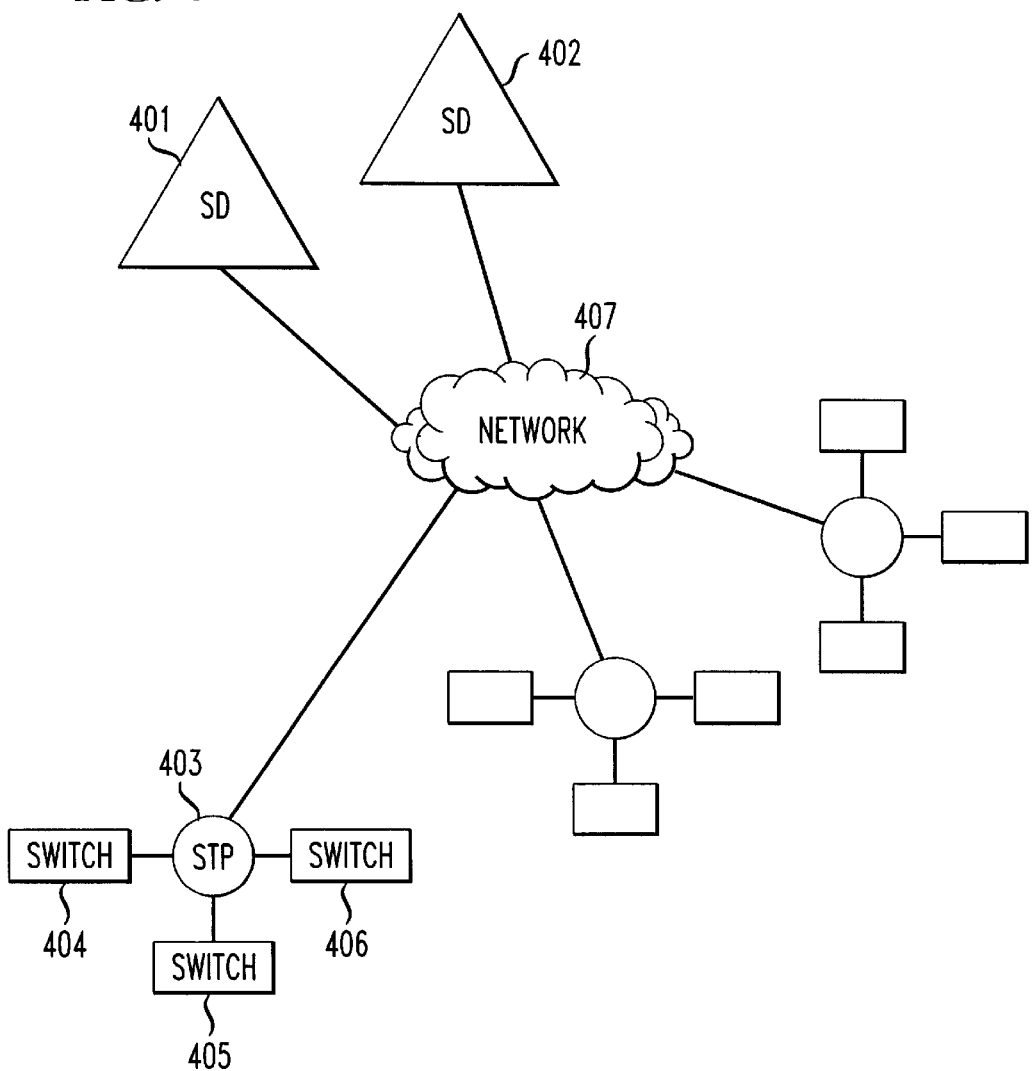
FIG. 4 illustrates an embodiment of the present invention wherein the network traffic level from multiple traffic sources is regulated using fractional tokens distributed from a common transfer point.

An alternative embodiment of the present invention is shown in FIG. 4 wherein a system for regulating network traffic levels is constructed utilizing a traffic regulating element 403 to control the traffic levels between network traffic sources 404, 405, and 406, and network traffic destinations 401 and 402. In this embodiment, each network traffic source, 404, 405, and 406, is a telephone switch and each network traffic destination, 401 and 402, is a telephone network segmentation directory with functionality as described in regard to FIG. 2. The traffic regulating element 403 is embodied as a signal transfer point (STP) coupled between the switches and the segmentation directory.

The present invention regulates the traffic level through the use of signal transfer point 403 as a traffic regulating element that maintains the token banks used to control the network traffic level. For example, signal transfer point 403 receives a message from segmentation directory 401 indicating the desired rate at which directory 401 would like to receive messages. Signal transfer point 403 then prepares a token bank for use in controlling the rate that query messages are being sent to segmentation directory 401. Signal transfer point 403 adds a token or fraction thereof to the bank to correspond to each message that the segmentation directory can handle in a particular time period. As described previously, in order to prevent the tokens from accumulating in large numbers when the network traffic level is low, the token bank is periodically checked to ensure that the number of tokens does not exceed a certain threshold and if that threshold has been exceeded the number of tokens is reset to that threshold number.

The process that occurs when a query message is sent is as follows. When switch 404 needs to send a query message to directory 401, it first sends a request to signal transfer point 403 for permission to send the query message. Signal transfer point 403 checks the token bank and if the number of tokens in the bank is greater than or equal to one, it sends a response back to switch 404 granting it permission to send the query message to directory 401 and decrements the token bank by one. If the number of tokens in the bank is less than one, signal transfer point 403 sends a response back to switch 404 denying it permission to send the query message. Switch 404 can then put the query message in a waiting queue and after a specified period of time requests permission again or switch 404 may simply discard the query message.

The token bank of the present invention can also be implemented in a variety of other ways. Separate token banks can be maintained for each network traffic destination. For example, signal transfer point 403 could maintain separate token banks for segmentation directories 401 and 402. Segmentation directories 401 and 402 could have maximum traffic rates that are identical or each rate could be set independently. When signal transfer point 403 received a request for permission to send a query message, it would check the appropriate token bank based on the intended destination of the query message as specified in the request and respond appropriately. Alternatively, signal transfer point 403 could maintain a single token bank and limit switches 404, 405, and 406 to a particular maximum traffic rate regardless of the final destination of the network messages being sent. In another alternative, signal transfer point 403 could maintain separate token banks for directories 401 and 402, but when a request is received, signal transfer point 403 would check the number of tokens in both banks and send back a response identifying the directory with the largest number of tokens in its bank, so long as that number was greater than or equal to one. For example, when a request to send a query message is received from switch 404, the token bank for directory 401 has 3.5 tokens in it and the token bank for directory 402 has 2.5 tokens in it. Signal transfer point 403 would send back a response indicating that switch 404 should send the query message to directory 401 and one token would be subtracted from the token bank for directory 401. This alternative would require that directories 401 and 402 have the same functionality, but would result in load balancing across the directories as well as controlling the overall network traffic level.

The present invention could also be used for traffic regulation and load balancing in a variety of systems other than telephone switching networks. For example, the present invention could be used in a network for web servers. A load balancing element, analogous to signal transfer point 403, would maintain token banks for a number of web servers, analogous to directories 401 and 402. When a request came in from a web browser client, analogous to switch 404, the load balancing element could check the token banks of each of the respective web servers, determine which server is best able to handle the request based on the number of tokens in the token banks, and then route the web browser client's request appropriately.

The present invention provides a method for controlling network traffic levels through the use of token banks that allow the desired traffic level and token balance in the token banks to be implemented as numbers with a fractional component. This allows greater flexibility in controlling the network traffic and results in improved overall network performance.

The present invention is not limited to the specific embodiments described. It is expected that those skilled in the art will be able to devise other implementations that embody the principles of the present invention and remain within its scope.

What is claimed is:

1. A method for regulating the traffic level on a telecommunications network, comprising:

using a traffic regulating element that allows the transmission of network messages based on a preallocated number of message tokens per each particular time period, and wherein said each particular time period is divided into subintervals, and wherein an equal portion of said message tokens is allocated to each of said subintervals;

receiving a request from a traffic source for permission to transmit a message;

determining the number of allocated message tokens contained in a token bank; and transmitting a resoponse to said traffic source.

2. The method of claim 1 wherein:

if the number of message tokens available is greater than or equal to one, said response grants permission to said network traffic source to transmit a message.

3. The method of claim 2 further comprising the step of:

decrementing the number of available message tokens by one if the number of message tokens available is greater than or equal to one.

4. The method of claim 1 wherein:

if the number of message tokens available is less than one, said response denies permission to said network traffic source to transmit messages.

5. The method of claim 1 wherein:

said traffic regulating element increments said number of available message tokens by a number including a fractional component at a specified subinterval of said particular time period.

6. The method of claim 5 wherein;

said number including a fractional component is equal to said preallocated number of message tokens divided by the number of specified subintervals per said particular time period.

7. A system for regulating the network traffic level on a telecommunications network, comprising:

a network traffic destination;

a plurality of network traffic sources; and a network traffic regulating element coupled via the network to said plurality of network traffic sources and said network traffic destination, wherein said network traffic regulating element only allows said plurality of network traffic sources to produce network traffic at a level less than or equal to a predetermined maximum traffic level, wherein said network traffic regulating element maintains said maximum traffic level as a number of message tokens per each specified time period, wherein said tokens are distributed equally among subintervals over said each specified time period, and each token corresponding to permission to send a single network message, and wherein said network traffic regulating element maintains a bank of available message tokens in such a way as to allow values with a fractional component.

8. The system of claim 7, wherein said plurality of network traffic sources include telephone switching equipment.

9. The system of claim 8, wherein said network traffic destination comprises a directory providing telephone call routing information.

10. The system of claim 7, wherein said plurality of network traffic sources includes web browser clients.

11. The system of claim 10, wherein said network traffic destination comprises a web server.

12. The system of claim 7 further comprising:

a second network traffic destination; wherein said network traffic regulating element maintains a second maximum traffic level value separate from that associated with said first network traffic destination and separate token banks for each network traffic destination, and said network traffic level regulating element allows said plurality of network traffic sources to produce network traffic based on the destination of said network traffic produced.

13. A method for regulating the traffic level on a telecommunications network, comprising:

allocating a number of tokens to a token bank based on a predetermined rate of sending network messages;

determining whether a message is waiting to be sent over the network;

determining the amount of tokens in said token bank;

sending said message, if said amount of tokens is greater than or equal to one;

wherein said token bank can store the amount of tokens as a value including a fractional component, wherein said allocated number of tokens is a number with a fractional component, and wherein said rate of sending network messages is expressed as the maximum number of messages to be sent in a particular time period.

14. The method of claim 13, further comprising the step of:

decrementing said token bank by one, if said waiting message was sent.

15. The method of claim 14, wherein said allocating step is comprised of the substeps of:

dividing said particular time period into subintervals; and distributing said number of tokens equally across said subintervals.

16. The method of claim 15 further comprising the step of:

resetting the number of tokens to a particular value if the number of tokens exceeds said particular value.

17. A system for regulating the network traffic level on a telecommunications network, comprising:

a network traffic destination; and a network traffic source coupled via the network to said network traffic destination, wherein said network traffic destination provides a maximum traffic level to said network traffic source, and said network traffic source produces network traffic at a level less than or equal to said maximum traffic level, wherein said network traffic source maintains said maximum traffic level as a number of message tokens per each specified time period, wherein said tokens are distributed equally among subintervals over said each specified time period, and each token corresponding to permission to send a single network message, and wherein said network traffic source maintains a bank of available message tokens in such a way as to allow values with a fractional component.

18. The system of claim 17, wherein:

said network traffic source is telephone switching equipment.

19. The system of claim 18, wherein:

said network traffic destination is a directory providing telephone call routing information.

20. The method of claim 1 wherein said number of allocated message tokens is stored as a value with a fractional component.

21. A program storage device readable by a machine, tangibly embodying a program of executable instructions to perform a method for regulating the traffic level on a telecommunications network, the method comprising:

using a traffic regulating element that allows the transmission of network messages based on a preallocated number of message tokens per each particular time period, and wherein said each particular time period is divided into subintervals, and wherein an equal portion of said message tokens is allocated to each of said subintervals;

receiving a request from a traffic source for permission to transmit a message, determining the number of allocated message tokens contained in a token bank; and transmitting a response to said traffic source.

22. A program storage device readable by a machine, tangibly embodying a program of executable instructions to perform a method for regulating the traffic level on a telecommunications network, the method comprising:

allocating a number of tokens to a token bank based on a predetermined rate of sending network messages;

determining whether a message is waiting to be sent over the network;

determining the amount of tokens in said token bank:

sending said message, if said amount of tokens is greater than or equal to one;

wherein said token bank can store the amount of tokens as a value including a fractional component, wherein said allocated number of tokens is a number with a fractional component, and wherein said rate of sending network messages is expressed as the maximum number of messages to be sent in a particular time period.

* * * * *